(12) United States Patent  
Gentile

(10) Patent No.: US 8,016,225 B2  
(45) Date of Patent: Sep. 13, 2011

(54) DAMAGE RESISTANT AIRCRAFT

(76) Inventor: Francis Xavier Gentile, Los Angeles, CA (US)

( * ) Notice: Subject to any disclaimer, the term of this patent is extended or adjusted under 35 U.S.C. 154(b) by 660 days.

(21) Appl. No.: 11/561,392

(22) Filed: Nov. 18, 2006

(65) Prior Publication Data

US 2007/0114326 A1    May 24, 2007

Related U.S. Application Data

(60) Provisional application No. 60/822,508, filed on Jul. 27, 2006, provisional application No. 60/597,272, filed on Nov. 19, 2005.

(51) Int. Cl.    *B64C 39/00*    (2006.01)
(52) U.S. Cl. ...................... 244/12.2; 244/45 A
(58) Field of Classification Search ............ 244/5, 12.2, 244/12.5, 23 C, 25, 30, 45 A
See application file for complete search history.

(56) References Cited

U.S. PATENT DOCUMENTS

| | | | |
|---|---|---|---|
| 2,062,148 A | | 11/1936 | Snyder |
| 2,431,293 A | | 11/1947 | Zimmerman |
| 2,876,964 A | * | 3/1959 | Streib ........................ 244/12.2 |
| 2,955,776 A | * | 10/1960 | Ziegler ........................ 244/13 |
| 3,820,744 A | * | 6/1974 | Denton ........................ 244/5 |
| 4,014,483 A | * | 3/1977 | MacNeill ........................ 244/5 |
| 4,269,375 A | * | 5/1981 | Hickey ........................ 244/26 |
| 4,606,515 A | * | 8/1986 | Hickey ........................ 244/29 |
| 5,645,248 A | * | 7/1997 | Campbell ........................ 244/30 |
| 5,730,391 A | * | 3/1998 | Miller et al. ........................ 244/36 |
| 5,836,542 A | * | 11/1998 | Burns ........................ 244/12.2 |
| 5,881,970 A | * | 3/1999 | Whitesides ........................ 244/23 C |
| 6,113,029 A | * | 9/2000 | Salinas ........................ 244/23 C |
| 6,286,783 B1 | * | 9/2001 | Kuenkler ........................ 244/30 |
| 7,173,649 B1 | * | 2/2007 | Shannon ........................ 348/144 |

* cited by examiner

*Primary Examiner* — Joshua J Michener  
*Assistant Examiner* — Brian M O'Hara

(57) ABSTRACT

Integration of structure and aerodynamic shape results in a Damage Resistant Unmanned Aircraft, Capable of surviving ground handling and impacts with plants, wires, solid objects and water. The structure dismantles for transport and storage into a small space, that is resistant to damage. The aerodynamic arrangement has a improved ability to fly controllably in the gusty environment that causes difficulty for small light weight aircraft. A method of mounting pneumatic and fabric shapes onto a Damage Resistant Aircraft with parts facilitating a round structure. Use of the pneumatic shapes to adjust the length and stiffness of the post. The post produces tension on the structure that It presses against. Inflatable post ends and an attachment system. Multi piece removable wing tips which allow deflation, access and small folding volume of the inflatable structure. All tension rudders are formed inside the net structure where it is protected from damage.

8 Claims, 10 Drawing Sheets

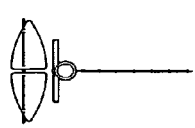
Fig. 2a
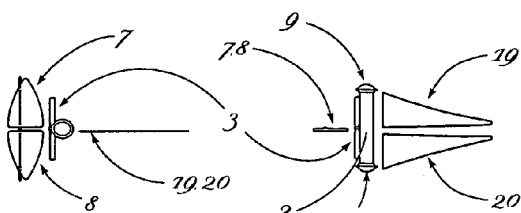
Fig. 2c  Fig. 2d
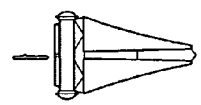
Fig. 2e
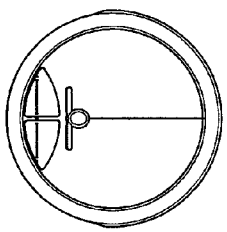
Fig. 2f
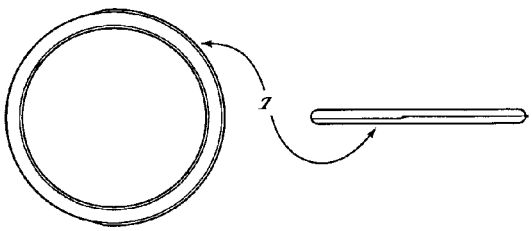
Fig. 2g  Fig. 2h
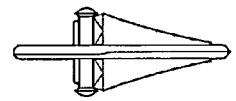
Fig. 2j
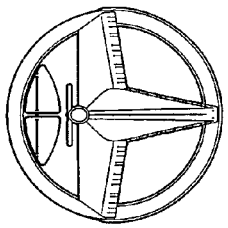
Fig. 2k
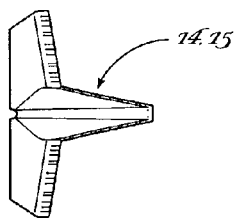
Fig. 2m
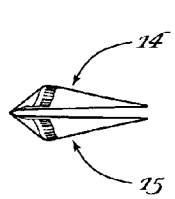
Fig. 2n
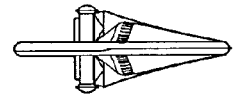
Fig. 2p
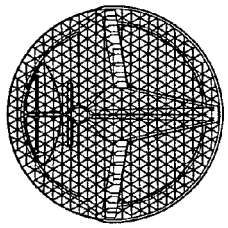
Fig. 2r
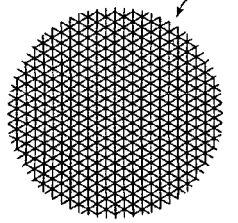
Fig. 2s
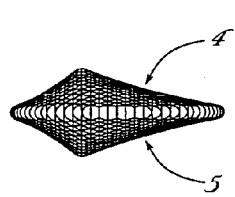
Fig. 2t  Fig. 2u
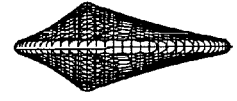
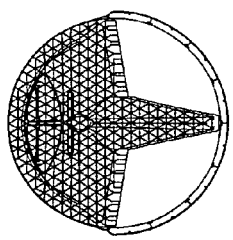
Fig. 2w
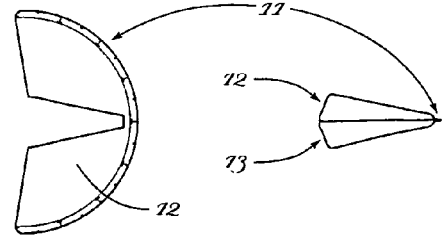
Fig. 2x  Fig. 2y
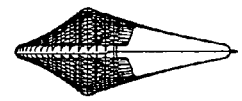
Fig. 2z

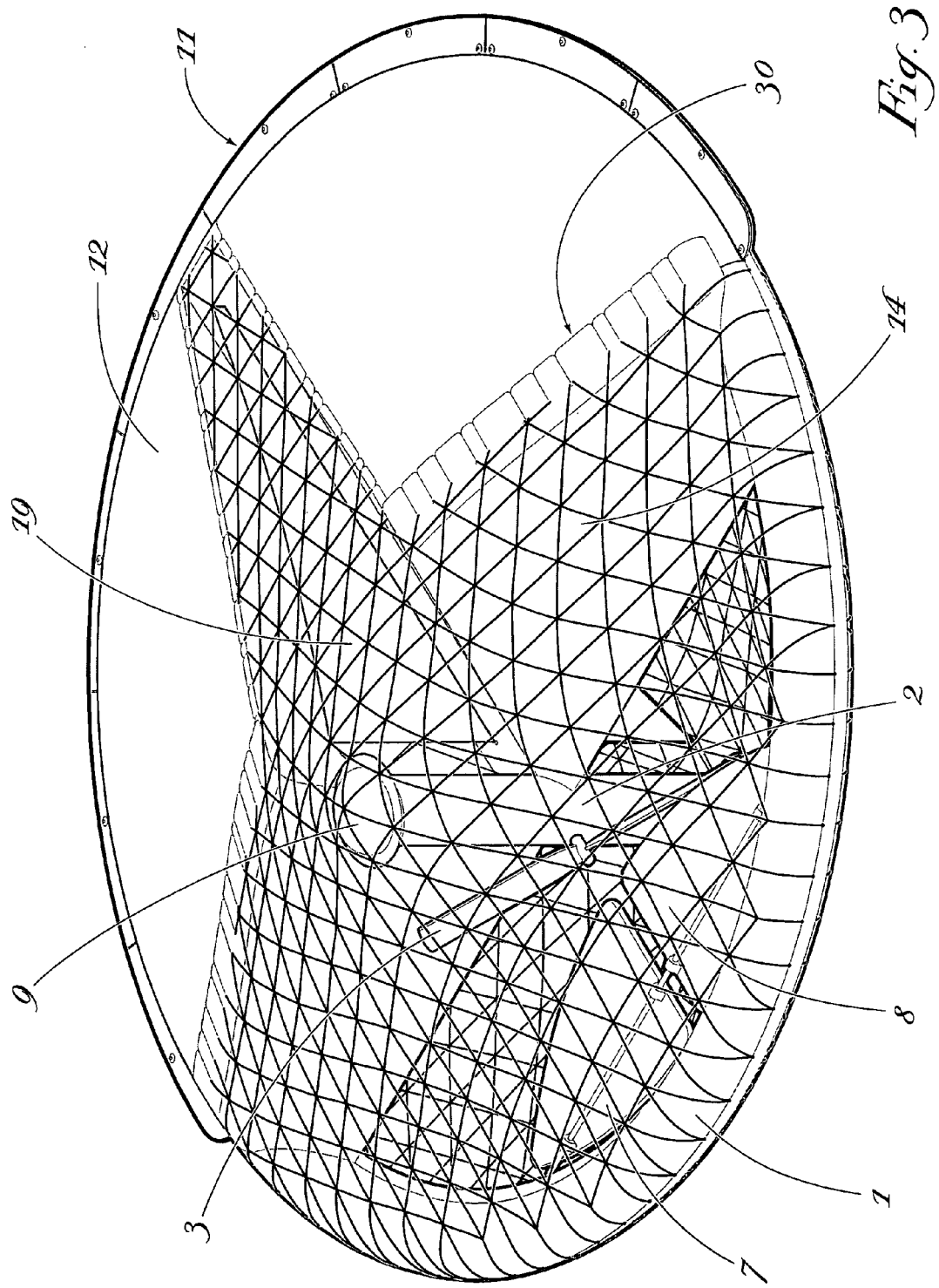

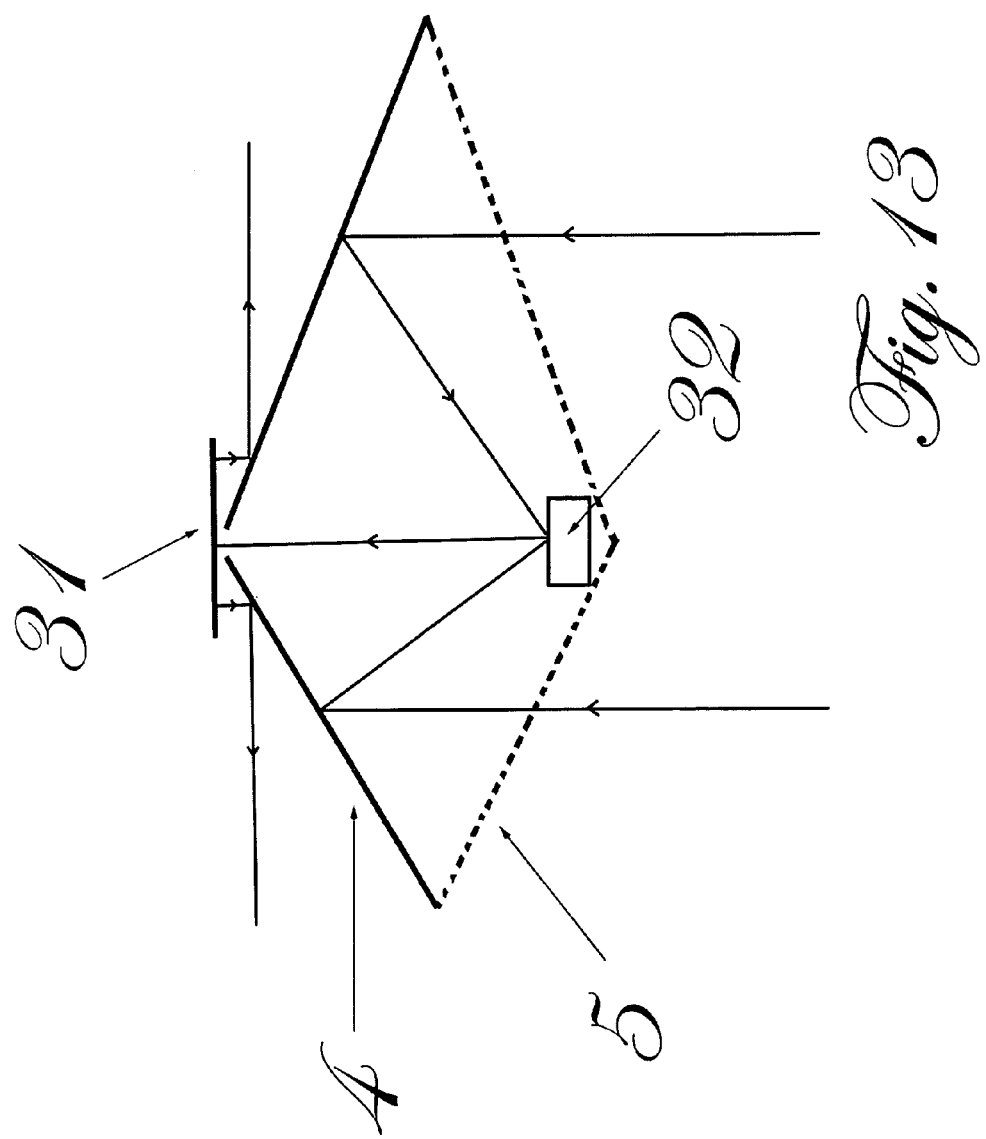

DAMAGE RESISTANT AIRCRAFT

FIELD OF THE INVENTION

The invention relates generally to aircraft.

BACKGROUND INFORMATION

As aircraft become smaller, lighter, slower or have a lower wing loading, the structure usually becomes more fragile and delicate. With a light structure it becomes more difficult to make a strong tail, a strong thick airfoil that can be disassembled for storage and transport. The placement of the propeller is usually subject to damage to itself or the operator. The placement of the propeller at some distance from the center of lift and gravity can overpower the small inertia and aerodynamic forces of a slow moving aircraft.

During the 1930's, semi-circular planform aircraft were developed and flown and found to have advantages in slow and high speed flight. The Arup series and the Vought V-173 demonstrated some of the widest performance ranges between slow speed and high speed ever recorded for aircraft of low power, Ref. 5,6,7. However these aircraft type never came into wide use and subsequently disappeared. Ref. 1,2,8 demonstrated that the semi-circle is unique compared to most other planform designs in that the center of pressure does not move forward as the angle of attack is increased. Swept wings, and delta wings and pure circle wings do have a center of pressure which moves forward pulling the aircraft into steeper and steeper angles, a runaway unstable condition that can lead to loss of airspeed and control. In these unstable planforms, The statically trimmed tail no longer has automatic aerodynamic correction of dynamic excursions from the desired angle of attack on the main wing.

Depending on the wing section chosen, a high aspect ratio straight square wing type airplane is not necessarily unstable. However a high aspect ratio wing has excessive gust response, and consequently poor controllability operating at speed near the ground, Ref. 9. The straight wing can stall in a way that semi-circle and delta wings will not, Ref. 1,2,3. The B-1, F-111 and Tornado swing wing planes were designed to change themselves into a low aspect ratio delta wing aircraft to improve gust penetration. To land and take off these swing wing aircraft become high aspect ratio wings in order to fly slowly. A simpler, lighter, controllable and damage tolerant design is needed for low wing loading aircraft. This invention of a semi-circular planform integrated into a new structure can achieve slow and high speed flight with good gust penetration. This invention will be able to operate in airspace that is not presently well used. A stable platform will enhance the quality of airborne photography and video.

The structure of the invention allows the construction of a symmetrical airfoil to reduce or eliminate moments about the center of lift with changes of angle of attack. The structure of the invention allows the construction of a thick wing section which reduces sudden changes of lift due to changes of angle of attack caused by gusts.

The use of flying wing tailless designs is common on popular small military UAVs, perhaps to avoid delicate tails which could be damaged. The flying wing's tail is in the rear of the main airfoil in the form of reflex control surfaces that act as elevator and aileron. These elevator surfaces lack moment arm power, which varies to the square of tail arm length, and lack dampening, which varies to the cube of tail arm length. The elevator lacks the ability to assume large angles of attack relative to the main wing. These surfaces are blanketed in the downwash of the wing which further reduces effectiveness. The result is the tailless aircraft's inability to fly under control at high angles of attack. Therefore the tailless designs cannot achieve low landing speeds. The invention is able to fly controllably at extremely high angles of attack without stalling. This inventions high angle of attack capability lowers landing speed and therefore reduces destructive impact forces by the square of the reduction in speed. This inventions high angle of attack capability reduces takeoff speed which makes launching easier.

During the short popularity of propellers directly mounted to the airframe of hang gliders during the early 1980's, a design inadequacy became tragically apparent. These directly powered hang gliders were unable to pull out of a dive or tumble within a reasonable amount of altitude because they lacked a tail on a moment arm that could assume large angles of attack relative to the main wing, Ref. 11. This invention has a moment arm with a canard that is capable of large angles of attack relative to the main wing. The tail mounted propellers of the early 1980's powered hang gliders added to the tendency of unstable pitch up at high angles of attack, as the thrust vector adds to the pitch up tendency with increasing angles of attack. This invention mounts the propeller almost directly on the center of gravity and aerodynamic center where the propeller cannot contribute to unstable pitch up.

Canard aircraft have recently and in the past, suffered accidents because of a lack of an all moving canard elevator capable of assuming large angles of attack needed to release the main wing and the canard from simultaneous high angle of attack conditions, Ref. 12,13. A canard aircraft can unexpectedly enter a high angle of attack condition when the inertia of a fast rising nose moves the fixed canard past the desired angle of stall faster than the approximately one second it takes for a wing to stall. During the one second it takes for the wing to stall, air flow remains attached to the canard wing and the canard wing achieves lift coefficients beyond those found in wing section data typically used by designers, Ref. 10. The swept or delta type main wing planform exacerbates the problem with a forward moving center of pressure near the stall angle that pulls the whole aircraft into a deeper stall. The result is a parachute style flat spin high angle of attack condition where the center of gravity is between the front and rear stalled wings. The aircraft may not be able to recover from this condition if the canard is fixed. An all moving canard capable of large angles of attack can remove the drag lift forces from the front of the aircraft, allowing the nose to drop to where the main wing can assume normal unstalled angles of attack. The Vought-Zimmerman semi circular aircraft types featured all moving elevators protruding from the rear sides of the main wing, Ref 6. These tails were aerodynamically effective, but not damage tolerant if applied to very light aircraft which do not land on runways. In this invention the control surfaces have been integrated into the structure as all moving canards where they are protected from damage, are structurally efficient and are capable of folding for transport and storage. The gap between the structural toroid and the internal all moving surface creates a beneficial slot effect which overcomes any problem of aerodynamic blockage.

In the case of the inflatable toroid, protection is provided to persons who might be impacted by the flying invention. The possibility of preventing damage to persons or property on the ground is important to regulatory and political acceptance of all flying machines, but most dramatically in the case of operations over congested areas by unmanned air vehicles.

In the 1900's some annular wing aircraft were built by Lee-Richards and Glen Curtis with circular wire bracing, but these aircraft did not have adequate aerodynamic control or efficiency, Ref. 3,4,5. These aircraft did not use the wire bracing as the wing surface, nor was wire bracing converted to a multidirectional net to make a functioning semi-skinned tension structure. The tension cabane bracing did not have a shear strength function as it was not a net. The motor and prop were not mounted to the central post or cabane strut. The post was not moved forward to form a large wing in the rear. The remaining circle area in front of the post has not been used to hold a canard type control. The circle of the wing did not take advantage of the strength of a restrained circular arch or toroid. Other concepts not integrated are Inflatable rings, Flotation, Foldability or Impact damage resistance.

Wire braced structures are used to this day in ultralights, hang gliders, bridges and large building construction as wire braced construction provides the best strength to weight ratio, Ref. 21,22,23,24. The structure of this invention makes the maximum use of light weight tension prestress by minimizing the compression structures to a single post and a single circular arch. This is a sparless construction. The use of tension can be increased by inflating the post and circular arch to stabilize the compression structure from the interior in the same way as liquid fuel rockets stabilize their skins with internal pressure to achieve amazing strength to weight ratios. The history of inflatable aircraft is without much practical application because the designs failed to use inflation pressure in its most efficient way. Known previous designs are little more than inflating the shape of existing conventional aircraft. This invention maximizes the benefit of tension and inflation.

Stowage and unfolding of portable aircraft is usually done with solid mechanical joints which add complexity and weight, Ref. 20. This invention has no complex joints and folds into smaller space than previous designs. Whether the invention uses solid materials for it compression members or if the compression member are inflatable, the advantages are significant.

Unmanned air vehicles are suffering from ground handling and landing damage, Ref 15. UAV operations have been limited by urban obstacles, low flying helicopters, and radio frequency congestion, Ref. 16,17,18,19. Small UAV operations in Baghdad, for example, would be beneficial to avoid ambushes. Advantages would accrue to a UAV which can fly slowly, fly low, avoid obstacles, survive impacts, launch and recover easily and frequently to download video that cannot be transmitted live in the combat environment where jamming and radar and other powerful transmitters prevent real time high bandwidth radio.

These and other aspects of the present invention will be more apparent from the following description.

BRIEF DESCRIPTION OF THE DRAWINGS

The invention is described by way of example with reference to the accompanying drawings wherein:

FIG. 2 is an illustration of a top and side view of components, in the order of assembly, associated with the aircraft.

FIG. 3 is an illustration of a top perspective view of the air vehicle, including a post and a plurality of inflatable ends.

Referring to FIG. 2, This aircraft has a circular ring frame known as a toroid 1 around its perimeter. Conical shaped tensioned nets 4 and 5 connect the toroid 1 and the post 2 to form the aircraft structure. In one embodiment the post 2 is forward of the center of toroid 1 in the longitudinal direction by about 25 percent to 33 percent of the toroid 1 greater overall diameter. The post 2 creates tension in the two cones of the conical shaped tensioned nets 4,5 becoming a compressive stress loading in the toroid 1. In one embodiment a plurality of inflatable pillows 9,10 are placed on both ends of the post 2. The post 2 effective length can be changed by inflation of the pillows 9,10. The change in post 2 length changes the level of tension and prestress in conical shaped tensioned nets 4,5. In one embodiment the pillows 9,10 are attached to the aircraft's conical shaped tensioned nets 4,5 and to the rigid structure of the post 2. The post 2 and the internal aircraft payloads and equipment are protected from impact damage by the inflated pillows 9,10.

In another embodiment, the aircraft has post without a plurality of inflatable pillows 9,10, instead a plurality of turnbuckles are used to adjust tension of the conical shaped tensioned nets 4,5.

In one embodiment a triaxial net pattern is used to transmit shear effectively in the conical shaped tensioned nets 4,5. This net is made of Spectra™ brand fiber woven in to a hollow core fishing line. Junctions in the net are formed by interweaving strands, knotting and applying flexible sealants such as silicone. In one embodiment the unskinned areas of the net could have a reduction in net density to improve airflow and reduce drag through the unskinned areas. Other materials and methods could be used.

Figure 8:
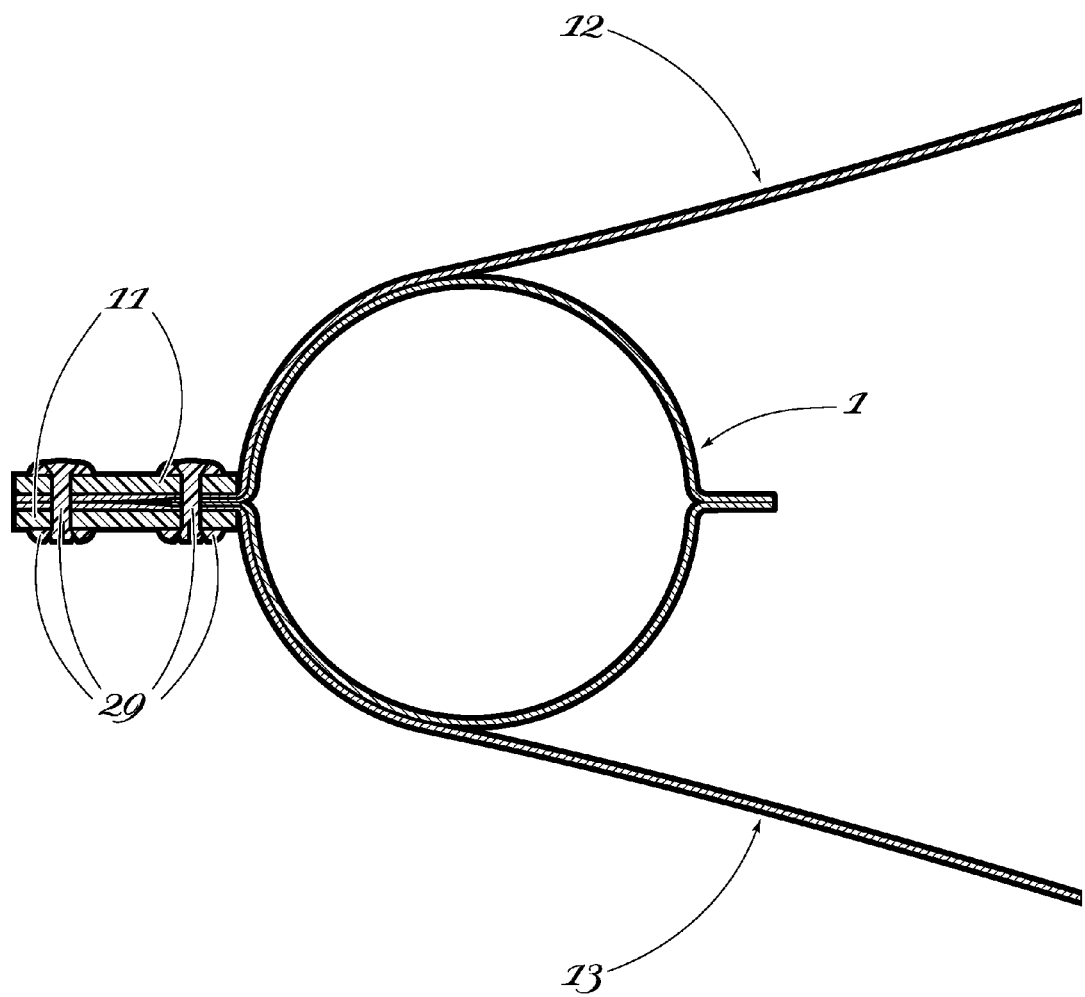
FIG. 8 is an illustration of a section of the toroid frame structure as circular in section including rear sandwich panels.
Figure 9:
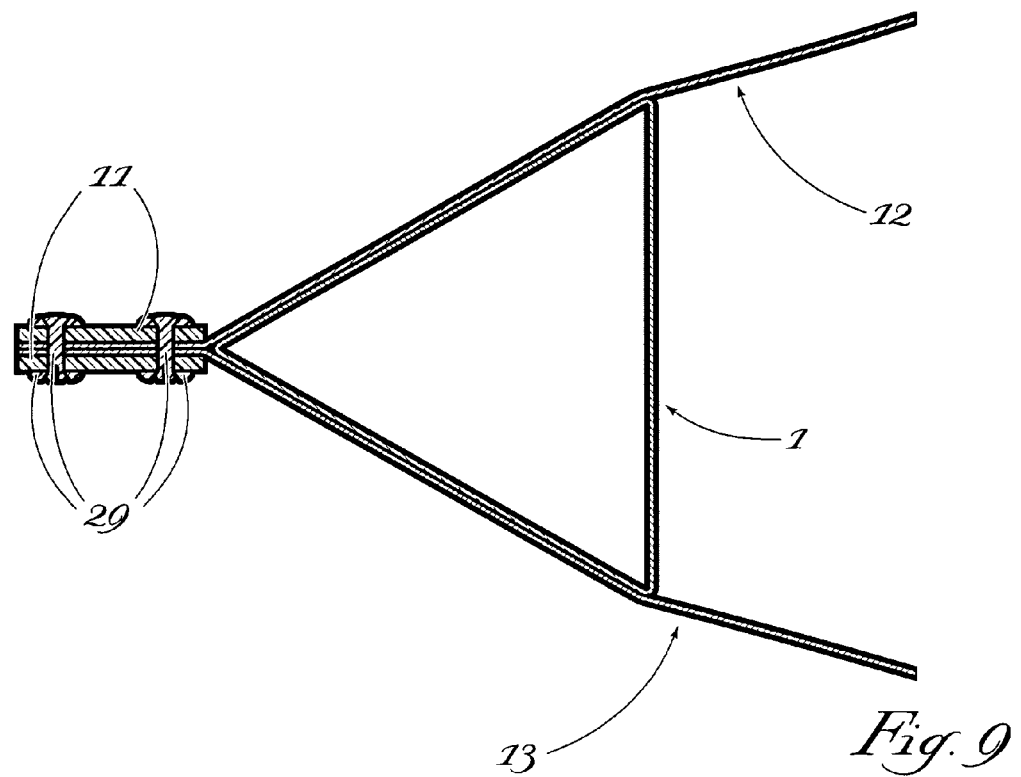
FIG. 9 an illustration of an embodiment of the toroid frame structure as triangular in section, including the rear sandwich panels.

In one embodiment the hollow toroid 1 can be made of pneumatically inflated fabric which has a circular sectional shape through out the circumference FIG. 8. In another embodiment the toroid 1 is made of a stiff self supporting materiel of a circular sectional shape FIG. 8 or triangular sectional shape FIG. 9 for structural efficiency.

The net wing skin inside the conical shaped tensioned nets 14,15 creates the leading edge of the wing and creates a thinner aft wing area behind the propeller 3 where the propeller slipstream or vena contracta can flow without obstruction. The net wing skin outside the conical shaped tensioned nets 12,13 attaches to the flanges of the net wing skin inside the conical shaped tensioned 14,15 which protrude through the conical shaped tensioned nets 4,5. The top and bottom of The net wing skin outside the conical shaped tensioned nets 12,13 are clamped together by sandwich panels 11 around the side and rear of the toroid. These sandwich panels 11 are curved to allow the sandwich panels to fold up with the deflated or dismantled toroid 1. The gaps between the sandwich panels 11 have only wing skin materiel connecting them, which allows folding. The sandwich panels 11 are clamped with removable fasteners 28. These sandwich panels 11 form a sharp wing tip edge discontinuity which causes aerodynamic flow separation at the wing tips, which in turn improves the lift of this type of planform.

The propeller 3 is mounted on and in front of post 2. In one embodiment there is a single propeller. In another embodiment there are dual contra rotating propellers. The area of the conical shaped tensioned nets 4,5 around the propeller and in front of the post 2 is unskinned allowing air to flow thru while preventing entry of the operator's hands to the propeller during launch and recovery. The conical shaped tensioned nets 4,5 prevent the propeller striking an object or ingesting objects. Placement of the center of thrust on or near the center of gravity and the center of drag reduces pitching moments due to thrust and thus reduces pitch changes caused by changes in thrust. A propeller proportionally larger than other aircraft propellers can be accommodated. A large propeller is capable of producing efficient thrust at lower tip speeds and consequently with lower noise. Lower noise is valuable for military stealth, collection of sound with microphones, and to prevent civilian noise complaints with civilian use.

Behind the post 2 are strake fin type rudders 19,20 attached inside the net wing skin 14,15 between the post and the toroid. The rudder 19,20 is created of tensioned fabric on the top and bottom of the wing area behind the post and propeller. The rudders 19,20 spoil undesirable lift that might develop from crosswinds or yawing that could change the longitudinal balance of the low aspect aircraft by creating an uncommanded pitch up or dive. The rudders 19,20 are protected from impact damage by internal mounting within the net. The rudders 19,20 fold easily with the deflation of the outer ring structure.

Figure 10:
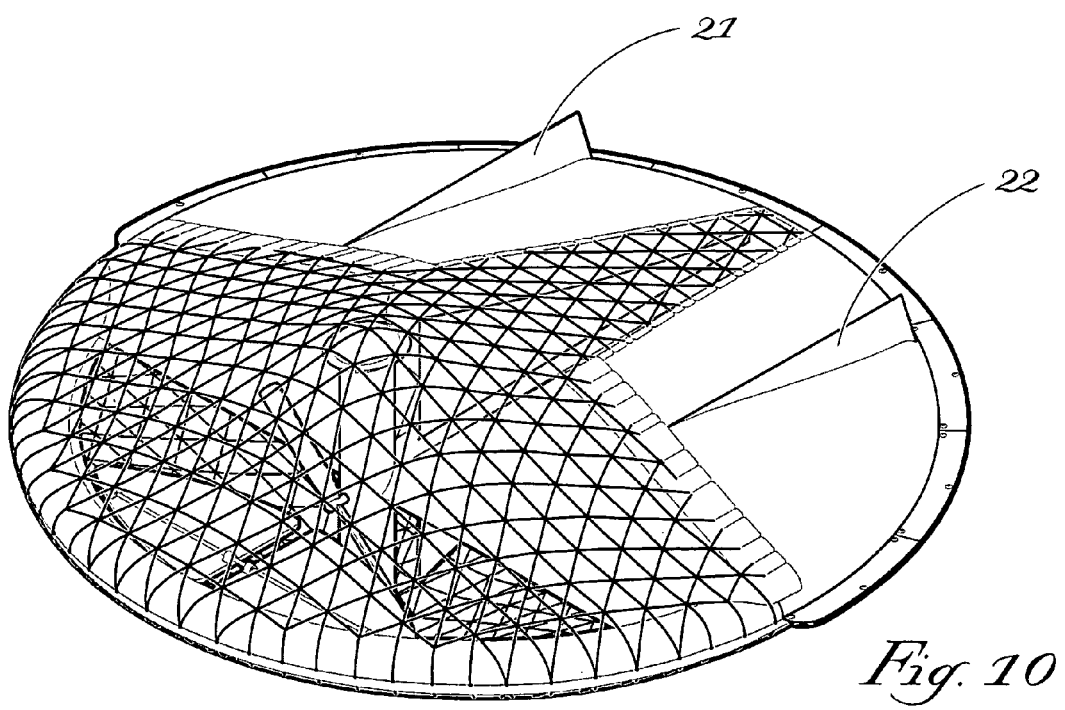
FIG. 10 is an illustration of a perspective view of an alternate four-tail configuration.

In another embodiment dual rudders FIG. 10 21,22, are placed on the top 21,22 and the bottom 14,15 on the net wing skin outside the conical shaped tensioned nets 12,13. The rudders 21,22, are placed at the approximate 25% of the wingspan. This position of the rudders spoils undesirable main wing lift that might develop from crosswinds or yawing that could change the longitudinal balance of the low aspect aircraft, creating an uncommanded pitch up or dive.

In the front interior of the toroid 1 and conical shaped tensioned nets 4,5 are hinge mounted differential aileron canard elevators known as canard elevator surfaces 7,8. The small gap between the structural toroid and canard elevator surfaces 7,8 creates a beneficial slot effect between the toroid 1 and the canard elevator surfaces to aid flow to the canard elevator surfaces by converting the toroid 1 into a useful leading edge device. The left and right sides of the canard elevator surfaces 7,8 are separate allowing differential operation for roll control. The trailing edge is movable between the top and bottom of the inside of the protection of tension net structure. The large range of angle of attack movement allows the canard elevator surfaces 7,8 to pull the craft out of vertical dives in a short vertical distance, or at the other extreme to form a large slot to aid flow over the top of the main rear wing in cruise trim. In another embodiment additional adjacent control surfaces may be used to gain sufficient area and hinge mounting for control within the curved space available, at the same time reducing the depth of the control surfaces to allow flow through the open area of the netting 4,5 FIG. 11 26,27.

Figure 11:
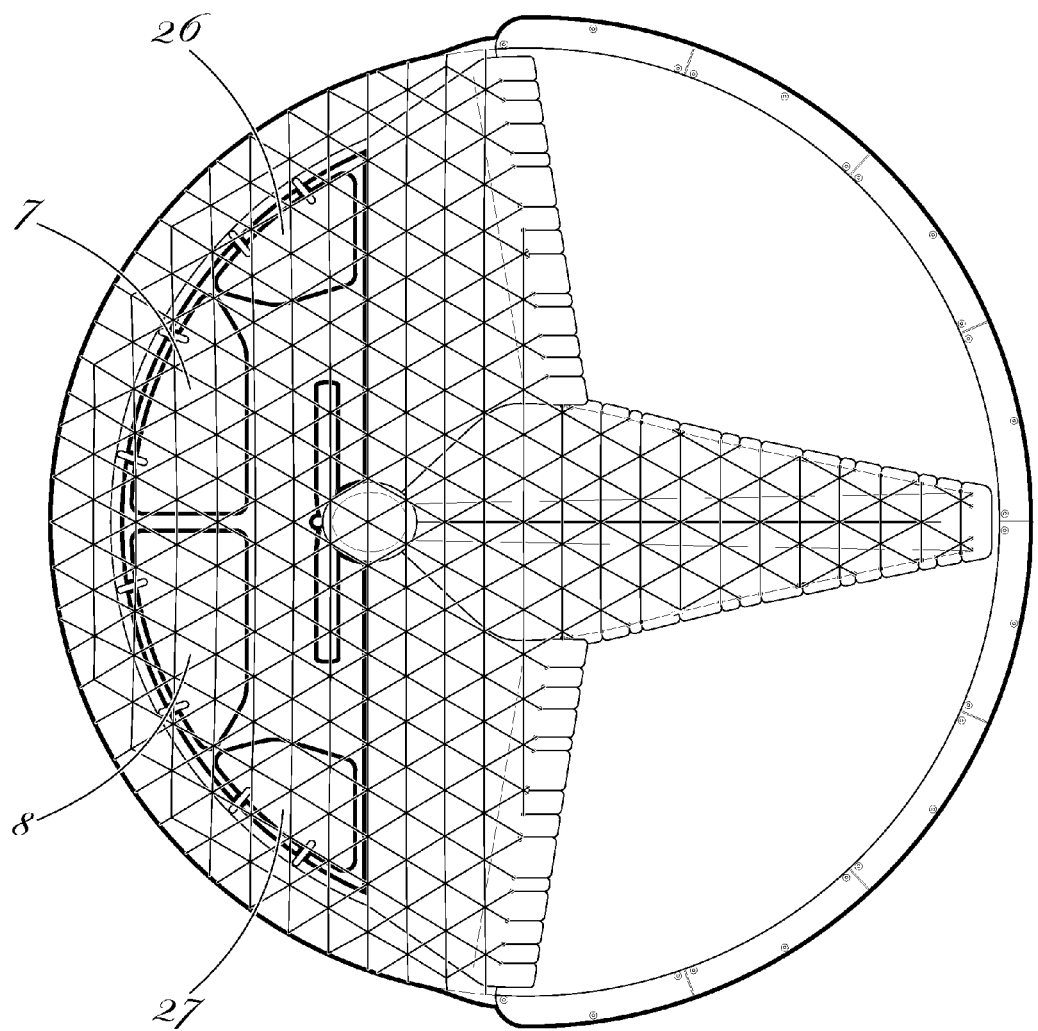
FIG. 11 is an illustration of an embodiment of a top view of an canard elevator surface configuration.
Figure 12:
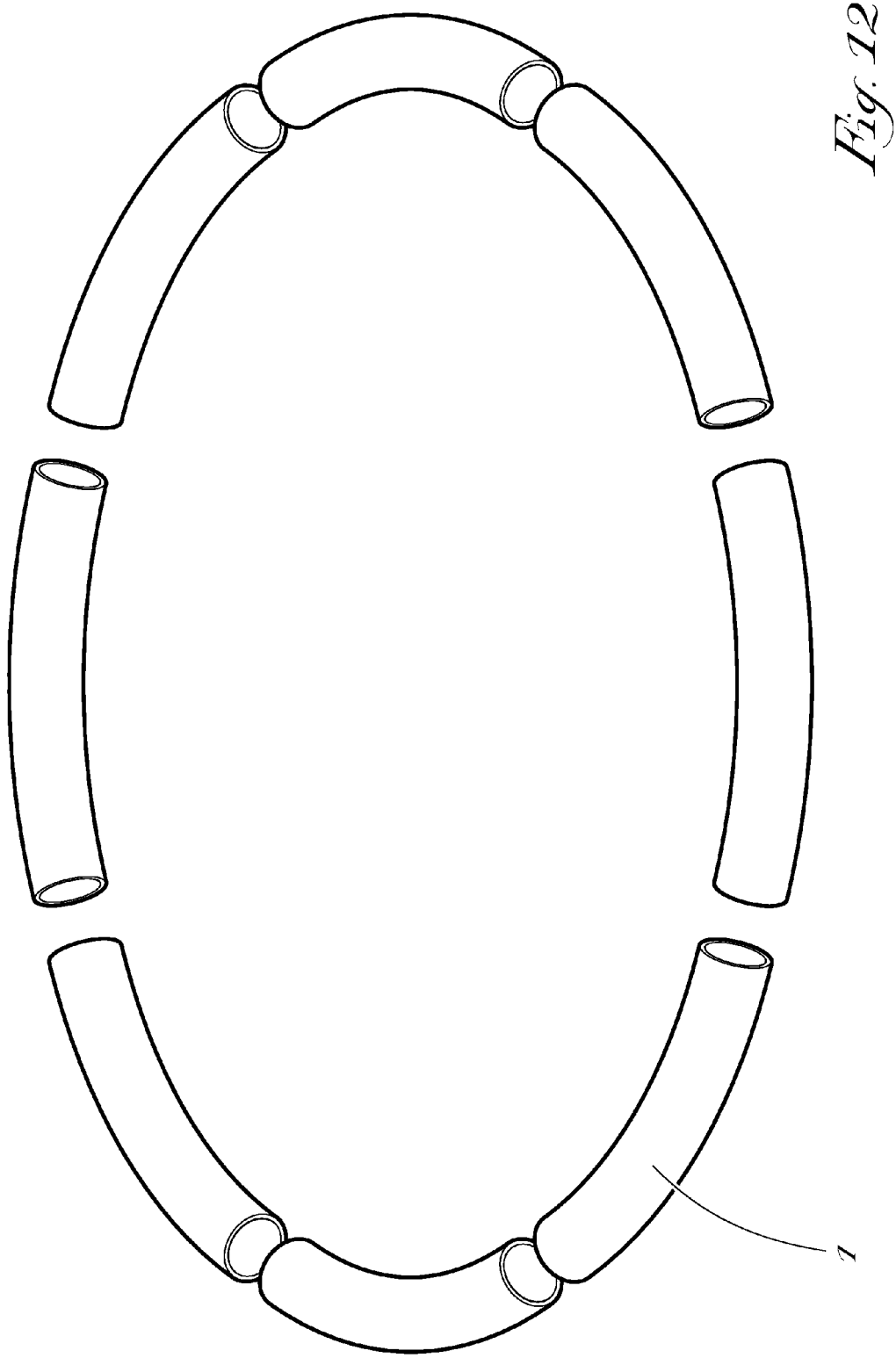
FIG. 12 is an illustration of an embodiment of a perspective view of a toroid of a hollow sectional shape of stiff materiel separable in pieces.

In one embodiment the front of the Canard elevator surfaces are hinged directly and closely upon the inside of the front of the toroid with two hinges per surface FIG. 11.

Figure 1:
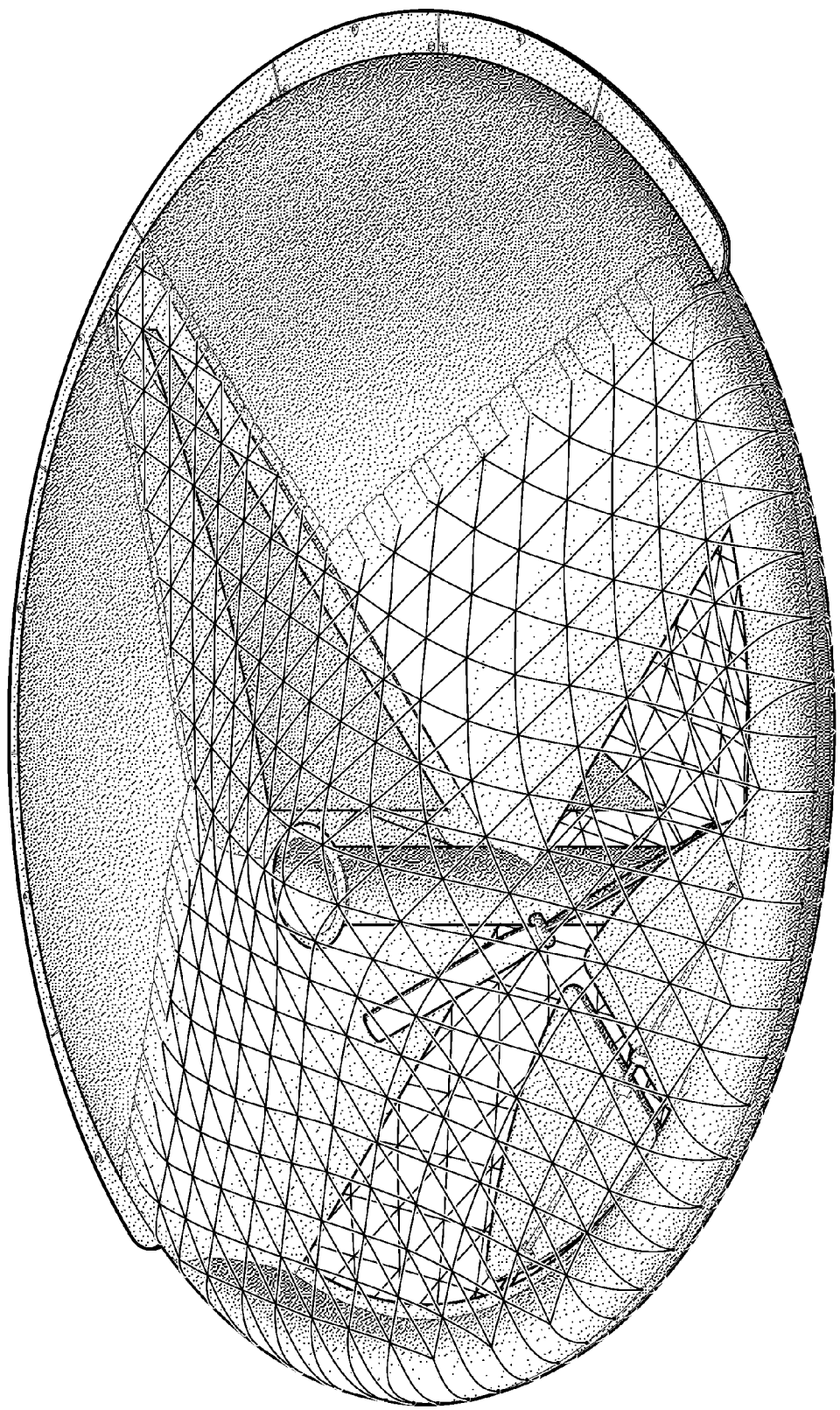
FIG. 1 is an illustration of a top perspective view of an aircraft.
Figure 4:
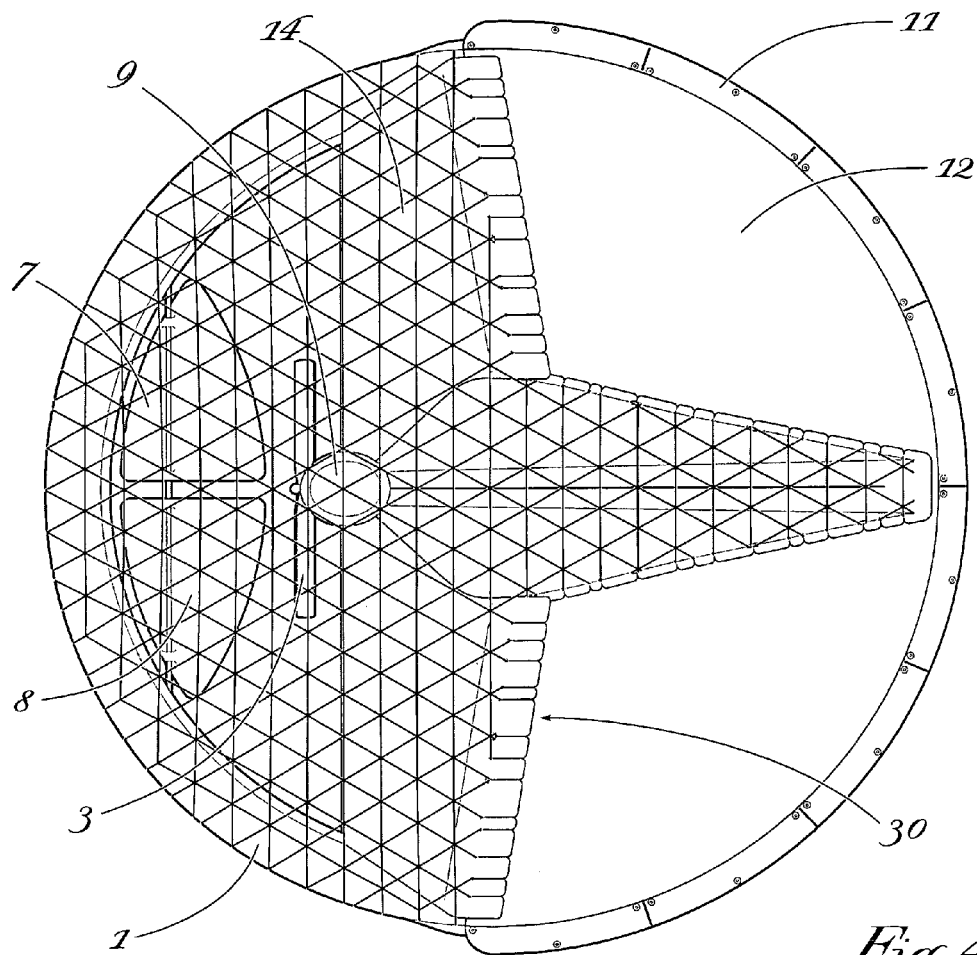
FIG. 4 is an illustration of a top view of the aircraft.
Figure 5:
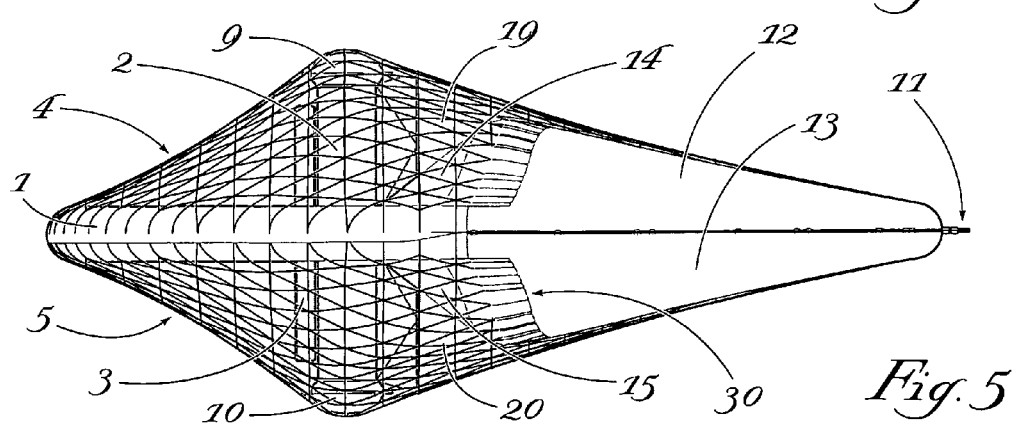
FIG. 5 is an illustration of a side view of the aircraft.
Figure 6:
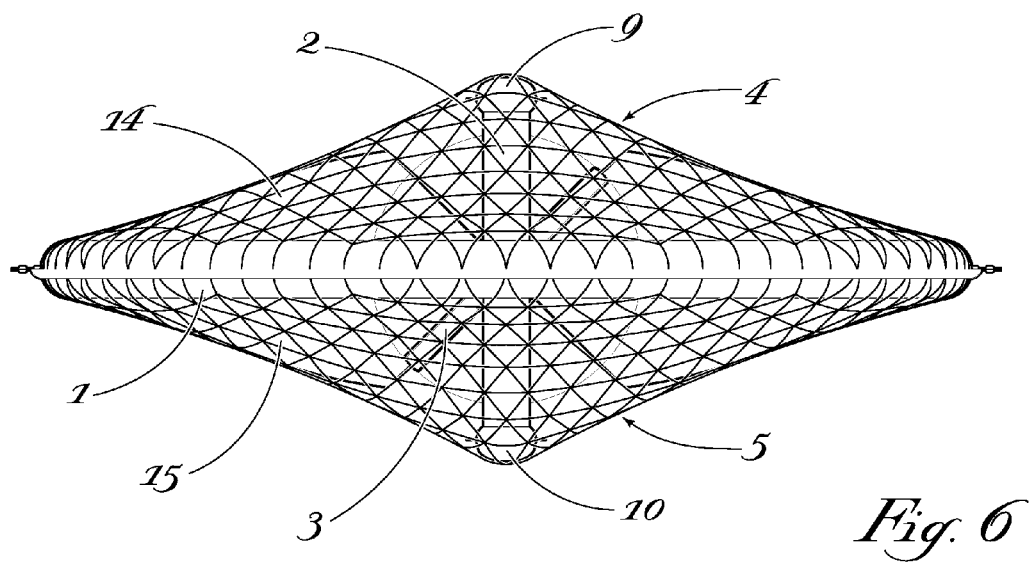
FIG. 6 is an illustration of a front view of the aircraft.
Figure 7:
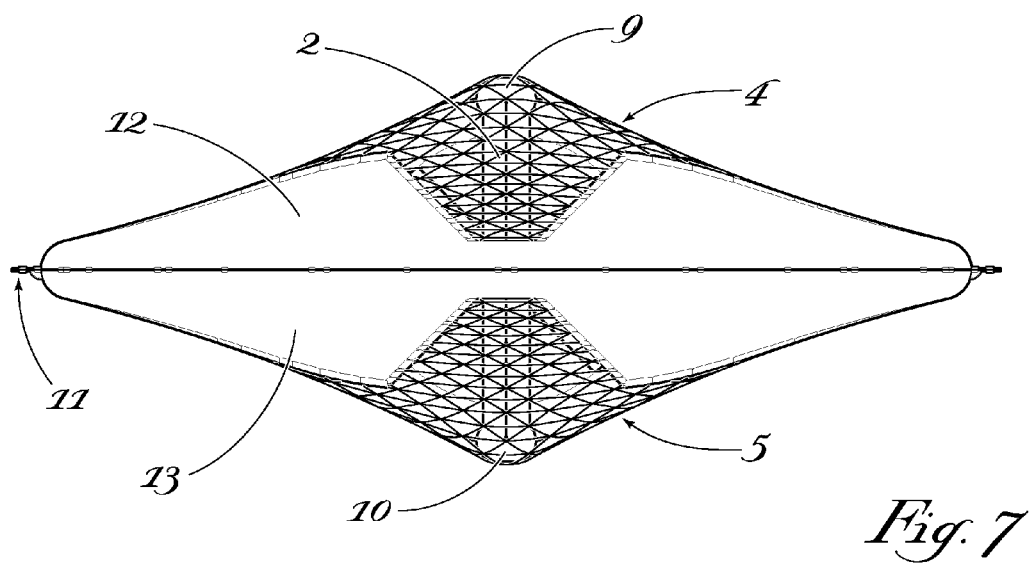
FIG. 7 is an illustration of a rear view of the aircraft.

In one embodiment the front of the Canard elevator surfaces are hinged upon the approximate 25 percent canard elevator surfaces with a long lateral hinge member, that is connected to the insides of the front of the toroid, FIG. 4.

In one embodiment the front of the Canard elevator surfaces are hinged upon the approximate 25 percent chord of canard elevator surfaces with hinges that reach directly forward to the nearest inside of the front of the toroid FIG. 11.

Tests performed on a scale glide model showed the front canard elevator surfaces capable of pulling the aircraft out of a vertical dive. Tests of the canard elevator surfaces in the extreme opposite position showed the canard elevator surfaces capable of converting itself to a slot function which pre guides the air over the main wing. Thus high relative angle canard elevator surfaces with moment arm have been integrated in the structure for resistance to damage and good strength to weight ratio and structural efficiency.

Air load tests of a crude prototype structure demonstrated excellent strength despite a sparse net and non symmetrical toroid.

The shape and structure of the aircraft can be used to form a directional antenna. In one embodiment the post 2 is moved to the center of the circle for optimization of a cassegrain reflecting antenna pointing below the aircraft for surveillance and a disk-cone antenna on top of the aircraft pointing to the sides, or the reverse for satellite communications. The large contiguous surface area allows the mounting of conformal array of antennas and transmit receive modules mounted over the large available area of the net structure. Inside the wing there is ample space for other forms of antennas.

In another embodiment, the wing skins could be used as human ear audio frequency speaker cones, to function as a remote public address system.

Advantageously, the post 2 can be un-jacked and un attached from the net. The post can be folded down flat to circle for toroid storage of a non inflatable solid toroid 1 where flat storage of the full diameter is useful. In the case of proposed Mars aircraft, the circle size matches the circular nature of the Apollo style atmospheric entry vehicle. If speed of deployment and the storage diameter size and flat shape is acceptable then a non-inflatable design is beneficial.

The invention aircraft's inherent aerodynamic stability avoids the poor outcomes of expensive and unreliable batteries, gyros, flight computers and constant radio contact when used in an unmanned mode. A lower cost unmanned Aircraft avoids dangerous ground patrols to recover lost aircraft in hostile territory.

The new utility from this invention includes, over water search and rescue with the aircraft itself capable of serving as a self delivering life ring flotation device and/or an anti-submarine sonobuoy. The aircraft can be launched and potentially recovered in quantity from fixed wing aircraft, helicopters, spacecraft, submarines, small boats, armored vehicles, guard posts and backpacks. A single person can carry several large unmanned air vehicles in deflated form and launch them without launching equipment and support vehicles.

The large enclosed volume of the wing accommodates sensor payloads, and can provide flotation for water recovery, or voluminous space for low pressure storage of gaseous fuels or lifting gases, carriage of cameras, weapons, and people.

Integration of structure and aerodynamic shape results in a Damage Resistant Aircraft, Capable of surviving ground handling and impacts with plants, wires, solid objects and water. The post and the internal aircraft payloads and equipment are protected from impact damage by the inflated pillows. The enclosed round shape of the aircraft structure is capable of glancing or bouncing off of objects with only temporary deflection of the ring and tension structure and no permanent damage in a way similar to a bicycle tire. The aircraft can fly slowly. The structure dismantles for transport and storage into a small space, that is resistant to damage. The aerodynamic arrangement has a improved ability to fly controllably in the gusty environment that causes difficulty for small light weight aircraft. Maximization of tension based structure reduces structural weight.

This invention is a unique, practical and efficient method to use and build the stable semi-circular planform aircraft concept with a elevator surface.

Additional modifications and improvements of the present invention may also be apparent to those of ordinary skill in the art. Thus, the particular combination of parts described and illustrated herein is intended to represent only one embodiment of the present invention, and is not intended to serve as limitations of alternative devices within the spirit and scope of the invention.

What is claimed is:

1. A heavier-than-air aircraft which comprises:
   a circular ring frame in the form of a toroid;
   two conical shaped tensioned nets connected around their perimeter to the circular ring frame;
   a post having a top end and bottom end, each of the top end and bottom end being connected to one of the respective two conical shaped tensioned nets;
   wherein the circular ring frame and the two conical shaped tensioned nets form an enclosed space, and the post is located completely within the enclosed space;
   said post creating tension in said two conical shaped tensioned nets creating compressive stress loading in the circular ring frame; and
   wherein said post is located forward of the center of said circular ring frame, in a longitudinal direction, by 25 to 33 percent of the circles diameter.

2. A heavier-than-air aircraft which comprises:
   a circular ring frame in the form of a toroid;
   two conical shaped tensioned nets connected around their perimeter to the circular ring frame;
   a post having a top end and bottom end, each of the top end and bottom end being connected to one of the respective two conical shaped tensioned nets;
   wherein the circular ring frame and the two conical shaped tensioned nets form an enclosed space, and the post is located completely within the enclosed space;
   said post creating tension in said two conical shaped tensioned nets creating compressive stress loading in the circular ring frame; and
   wherein said post has a propeller mounted thereon and said propeller is inside the conical shaped tensioned nets.

3. A heavier-than-air aircraft which comprises:
   a circular ring frame in the form of a toroid;
   two conical shaped tensioned nets connected around their perimeter to the circular ring frame;
   a post having a top end and bottom end, each of the top end and bottom end being connected to one of the respective two conical shaped tensioned nets;
   wherein the circular ring frame and the two conical shaped tensioned nets form an enclosed space, and the post is located completely within the enclosed space;
   said post creating tension in said two conical shaped tensioned nets creating compressive stress loading in the circular ring frame; and
   a plurality of canard elevator surfaces hinged upon the inside of the front of the toroid within the conical shaped tension nets.

4. The heavier-than-air aircraft as in claim 3, wherein said canard elevator surfaces comprise one surface on the port side and one surface on starboard side.

5. The heavier-than-air aircraft as in claim 3, wherein said canard elevator surfaces comprise two surfaces on the port side and two surfaces on starboard side.

6. The heavier-than-air aircraft as in claim 3, wherein the front of the canard elevator surfaces are hinged directly and closely upon the inside of the front of the toroid with two hinges per surface.

7. The heavier-than-air aircraft as in claim 3, wherein the front of the canard elevator surfaces are hinged upon the approximate 25 percent canard elevator surfaces with a long lateral hinge member that is connected to the insides of the front of the toroid.

8. The heavier-than-air aircraft as in claim 3, wherein the front of the canard elevator surfaces are hinged upon the approximate 25 percent chord of canard elevator surfaces with hinges that reach directly forward to the nearest inside of the front of the toroid.

* * * * *